(12) United States Patent
Goto et al.

(10) Patent No.: US 8,509,327 B2
(45) Date of Patent: Aug. 13, 2013

(54) RECEIVING APPARATUS AND METHOD AND PROGRAM

(75) Inventors: Yuken Goto, Tokyo (JP); Kenichi Kobayashi, Tokyo (JP); Suguru Houchi, Tokyo (JP)

(73) Assignee: Sony Corporation, Tokyo (JP)

( * ) Notice: Subject to any disclaimer, the term of this patent is extended or adjusted under 35 U.S.C. 154(b) by 308 days.

(21) Appl. No.: 12/836,667

(22) Filed: Jul. 15, 2010

(65) Prior Publication Data

US 2011/0019101 A1 Jan. 27, 2011

(30) Foreign Application Priority Data

Jul. 24, 2009 (JP) .................................. P2009-173592

(51) Int. Cl.
*H04K 1/00* (2006.01)

(52) U.S. Cl.
USPC ............ 375/260; 375/316; 375/326; 375/339

(58) Field of Classification Search
USPC .......................... 375/260, 316, 326, 226, 339
See application file for complete search history.

(56) References Cited

U.S. PATENT DOCUMENTS

2004/0208267 A1 10/2004 Lee
2009/0052561 A1* 2/2009 Baxley et al. ................. 375/260

FOREIGN PATENT DOCUMENTS

| JP | 11-205275 | 7/1999 |
|---|---|---|
| JP | 2001-298437 | 10/2001 |
| WO | WO 2009/050552 A2 | 4/2009 |
| WO | WO 2011/001632 A1 | 1/2011 |

OTHER PUBLICATIONS

Michael Speth et al: "Optimum Receiver Design for OFDM-Based Broadband Transmission-Part II: A Case Study", IEEE Transactions on Communications, IEEE Service Center, Piscataway, NJ, USA, vol. 49, No. 4, Apr. 1, 2001, XP011009914, ISSN: 0090-6778.
DVB Organization: "Draft ETSI TR 102 831 v<0.9.6> Digital Video Broadcasting (DVB); Implementation guidelines for a second generation digital terrestrial television broadcasting system (DVB-T2)", ETSI Feb. 20, 2009, pp. 1-195, XP017817721.
"Frame Structure Channel Coding and Modulation for a Second Generation Digital Terrestrial Television Broadcasting System (DVB-T2)", DVB Document A122 Jun. 2008.
Office Action issued in Japanese Application No. 2009-173592 on Feb. 28, 2013.

* cited by examiner

*Primary Examiner* — Leila Malek
(74) *Attorney, Agent, or Firm* — Oblon, Spivak, McClelland, Maier & Neustadt, L.L.P.

(57) ABSTRACT

Disclosed herein is a receiving apparatus including a preamble analyzer configured to receive a frame of DVB-T2 made up of an OFDM signal and analyze a preamble contained in the received frame; an offset detector configured to detect a fine offset and a coarse offset on the basis of the analyzed preamble; a carrier frequency corrector configured to execute carrier frequency correction on an OFDM time domain signal obtained by quadrature demodulation on the basis of the detected fine offset and the detected coarse offset; a determiner configured to determine whether the detection of the coarse offset has been completed; and a control signal outputter configured, if the detection of the coarse offset is determined to be completed, to output a control signal for feeding back the fine offset detected on the basis of an OFDM frequency domain signal obtained by FFT computation to the carrier frequency corrector.

8 Claims, 13 Drawing Sheets

FIG. 5

| NECESSARY INFORMATION | INFORMATION SOURCE | PRESET ENABLED /DISABLED |
|---|---|---|
| FFT SIZE | P1 OR L1 PRE-SIGNALING | ENABLED |
| SISO/MISO | P1 OR L1 PRE-SIGNALING | ENABLED |
| Mixed/Not mixed | P1 OR L1 PRE-SIGNALING | ENABLED |
| GI LENGTH | GI CORRELATION OR L1 PRE-SIGNALING | ENABLED |
| TRIGGER POSITION | P1 | DISABLED |
| FINE OFFSET | P1 | DISABLED |
| COARSE OFFSET | P1 | ENABLED |

FIG. 6

| NECESSARY INFORMATION | INFORMATION SOURCE | PRESET ENABLED /DISABLED |
|---|---|---|
| FFT SIZE | P1 OR L1 PRE-SIGNALING | ENABLED |
| SISO/MISO | P1 OR L1 PRE-SIGNALING | ENABLED |
| Mixed/Not mixed | P1 OR L1 PRE-SIGNALING | ENABLED |
| GI LENGTH | GI CORRELATION OR L1 PRE-SIGNALING | ENABLED |
| TRIGGER POSITION | P1 | DISABLED |
| FINE OFFSET | P1 | DISABLED |
| COARSE OFFSET | P1 | ENABLED |
| BAND EXPANSION YES/NO | L1 PRE-SIGNALING | ENABLED |
| NUMBER OF DATA SYMBOLS | L1 PRE-SIGNALING | ENABLED |
| PILOT PATTERN | L1 PRE-SIGNALING | ENABLED |
| TONE RESERVATION | L1 PRE-SIGNALING | ENABLED |

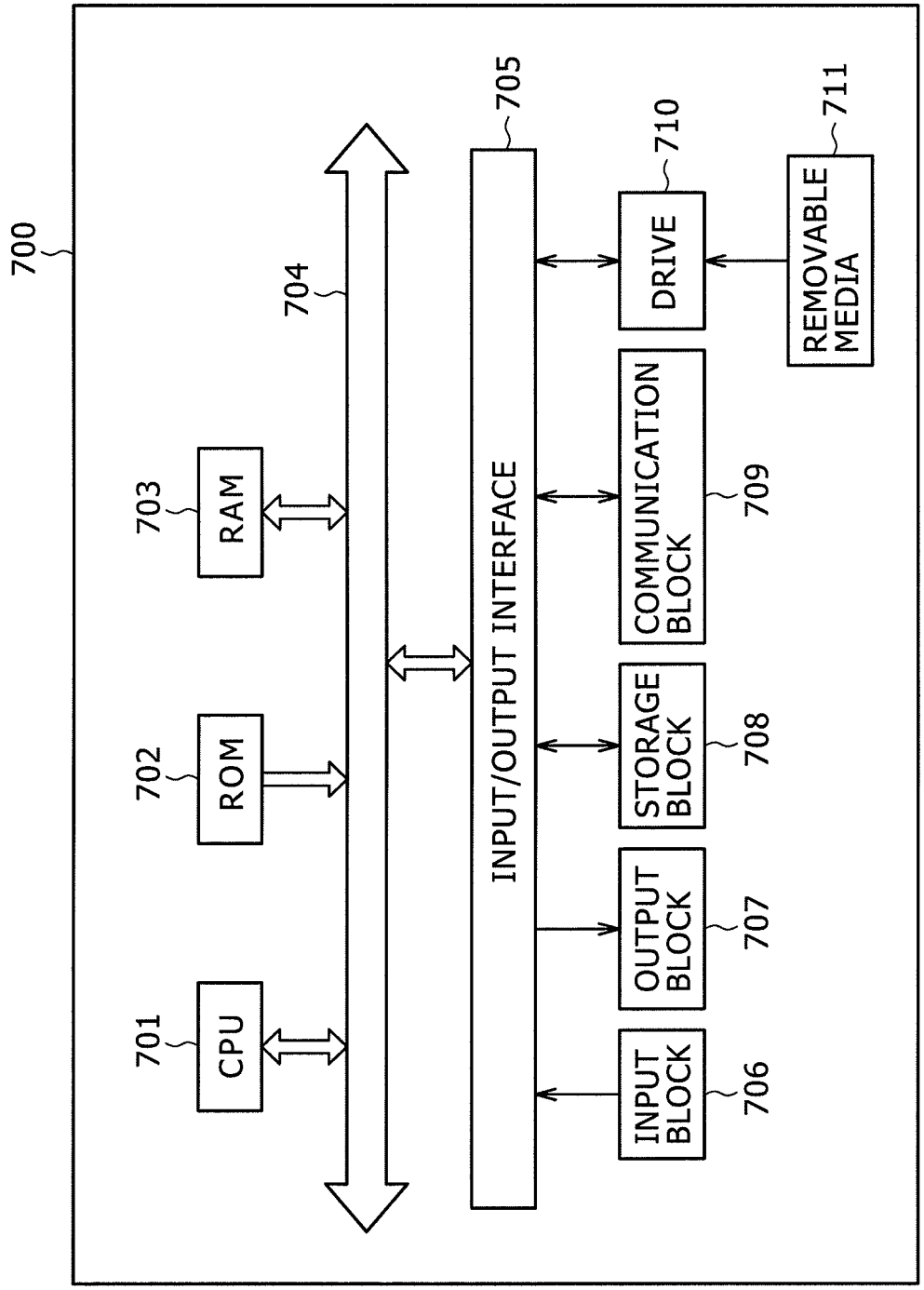

RECEIVING APPARATUS AND METHOD AND PROGRAM

BACKGROUND OF THE INVENTION

1. Field of the Invention

The present invention relates to a receiving apparatus, a receiving method, and a receiving program, and, more particularly, to a receiving apparatus, a receiving method, and a receiving program that are configured to early execute the decoding of an intended PLP (Physical Layer Pipe) in an OFDM (Orthogonal Frequency Division Multiplexing) signal of DVB-T2 (Digital Video Broadcasting-Terrestrial 2).

2. Description of the Related Art

Terrestrial broadcasting and so on use OFDM for data (or signal) modulating.

With OFDM, many orthogonal subcarriers are arranged in a transmission band and digital modulation, such as PSK (Phase Shift Keying) or QAM (Quadrature Amplitude Modulation), is executed to allocate data to the amplitude and phase of each of these subcarriers.

In order to divide the transmission band by many subcarriers, the band for each subcarrier (one wave) is narrow and the modulation speed is low, but the total transmission speed (of all subcarriers) remains substantially the same as the related-art modulating.

As described above, in OFDM, data is allocated to two or more subcarriers, so that the modulation can be executed by executing IFFT (Inverse Fast Fourier Transform). And the demodulation of an OFDM signal obtained as a result of the modulation can be executed by FFT (Fast Fourier Transform).

Therefore, a transmission apparatus configured to transmit OFDM signals can be configured by use of an IFFT computation circuit and a receiving apparatus configured to receive OFDM signals can be configured by use of an FFT computation circuit.

Further, with OFDM, a signal section called a guard interval is arranged to enhance the resistance against multipaths. In addition, with OFDM, a pilot signal that is a known signal (known on the side of the receiving apparatus) is discretely inserted in the direction of time or in the direction of frequency to be used by the receiving apparatus for synchronization, the estimation of transmission path characteristics, and so on.

Because OFDM has a high resistance against multipaths, OFDM is used by the terrestrial digital broadcasting and so on that are susceptible to multipath interference. The terrestrial digital broadcasting using OFDM includes DVB-T and ISDB-T (Integrated Services Digital Broadcasting-Terrestrial), for example.

With OFDM, data is transmitted on an OFDM symbol unit basis.

An OFDM symbol is generally configured by a valid symbol that is a signal interval in which IFFT is executed at the time of modulation and a guard interval with a partial waveform of the last half of this valid symbol copied to the beginning of the valid symbol without change.

Thus, arranging a guard interval at the beginning of each OFDM symbol allows the enhancement of the multipath resistance.

It should be noted that the terrestrial digital broadcasting standard based on OFDM defines a unit called a frame (an OFDM transmission frame) configured by two or more OFDM symbols and data transmission is executed on a frame basis.

In the receiving apparatus configured to receive OFDM signals as described above executes OFDM signal digital quadrature demodulation by use of the carrier of an OFDM signal.

It should be noted, however, that the OFDM signal carrier for use in digital quadrature demodulation in a receiving apparatus does not generally match an OFDM signal carrier for use in a transmission apparatus that transmits OFDM signals, including an error. To be more specific, the frequency of OFDM signal carrier for use in digital quadrature demodulation is offset from the center frequency of an OFDM signal (an IF (Intermediate Frequency) signal thereof) received by the receiving apparatus.

Consequently, the receiving apparatus executes carrier offset detection processing for detecting a carrier offset that is an error of the carrier of an OFDM signal for use in digital quadrature demodulation and correction (offset correction) processing for correcting the OFDM signal so as to eliminate the offset of the carrier by following the carrier offset.

It should be noted here that DVB-T2 (the second-generation European terrestrial digital broadcasting standard) is being drawn up for a terrestrial digital broadcast standard that uses OFDM.

For DVB-T2, refer to so-called DVB Blue Book A122 ("Frame structure channel coding and modulation for a second generation digital terrestrial television broadcasting system (DVB-T2)", DVB Document A122 June 2008).

DVB-T2 (the Blue Book thereof) defines a frame called a T2 frame. Data is transmitted in the unit of this T2 frame.

A T2 frame has two types of preamble signals called P1 and P2. These preamble signals contain the information necessary for the processing, such as demodulation of OFDM signals.

The P1 symbol is a symbol for transmitting P1 signaling. The P1 signaling includes a transmission type and basic transmission parameters.

To be more specific, P1 signaling (P1) contains parameters S1, S2, and so on. The parameters S1 and S2 are indicative in which of the schemes, SISO (Single Input, Single Output (meaning one transmitting and one receiving antenna)) and MISO (Multiple Input, Single Output (meaning multiple transmitting antennas but one receiving antenna)) P2 is transmitted, an FFT size (the number of samples (or symbols) subject to one session of FFT computation) for FFT computation of P2, and so on.

Therefore, the demodulation of P2 desires the decoding of a bit train corresponding to parameters S1 and S2 by orthogonally demodulating P1 for example.

The P2 symbol is a symbol for transmitting L1 pre-signaling and L1 post-signaling.

The L1 pre-signaling includes information for a receiving apparatus configured to receive a T2 frame to receive and decode the L1 post-signaling. The L1 post-signaling includes parameters necessary for a receiving apparatus to access the physical layer (the layer pipes thereof).

It should be noted that the T2 frame can have one to 16 OFDM symbol P2 preamble signals.

In addition, P1 and P2 each include pilot signals that are known signals. Namely, with P1, pilot signals are arranged on the subcarrier at a non-periodical position and, with P2, pilot signals are arranged on the subcarrier at a periodical position. Of the pilot signals, one that is periodically arranged for each predetermined number of subcarriers (or symbols) is called an SP (Scattered Pilot) and the other that is arranged on the subcarriers of the same frequency is called a CP (Continual Pilot).

Further, with the receiving apparatus, the FFT computation of OFDM signal is executed for each OFDM symbol. In DVB-T2, the number of symbols (or subcarriers) configuring one OFDM symbol, namely, FFT sizes are of six types, 1K, 2K, 4K, 8K, 16K, and 32K.

It should be noted here that a subcarrier interval of an OFDM symbol is in inversely proportional to the FFT size of the OFDM symbol. Therefore, the specification of the FFT size in DVB-T2 is equivalent to the specification of subcarrier intervals.

Further, DVB-T2 specifies that, for the OFDM symbols of P1, only 1K is used of the above-mentioned six types of FFT sizes and, for the other OFDM symbols, namely, P2 and others, specifies that any of the above-mentioned six types of FFT size is usable.

Consequently, for the OFDM symbols of P1, only the subcarrier having the widest subcarrier interval (the interval corresponding to the FFT size of 1K) among the subcarrier intervals specified by DVB-T2 is used.

For the OFDM symbols of P2 and others, namely the OFDM symbols of other than P1, that is, the OFDM symbols of P2, and the OFDM symbols of data (Normal), the subcarrier having any of the subcarrier intervals other than the widest subcarrier interval specified by DVB-T2 (namely, the intervals corresponding to the FFT sizes of 2K, 4K, 8K, 16K, and 32K) is usable in addition to the widest subcarrier interval.

It should be noted here that the OFDM signal of P1 has 1K (=1024) symbols as valid symbols.

The OFDM signal of P1 has a cyclic structure in which signal B1' obtained by frequency-shifting part B1 on the beginning side of a valid symbol is copied to the front side of the valid symbol and signal B2' obtained by frequency-shifting part B2 that is the remaining part of the valid symbol is copied to the rear side of the valid symbol.

The OFDM signal of P1 has 853 subcarriers as valid subcarriers. Of these 853 subcarriers, DVB-T2 locates information to 384 subcarriers.

The DVB-T2 Implementation Guidelines (ETSI TR 102 831: IG) describes that, if the transmission band for transmitting OFDM signals is 8 MHz for example, a "coarse" carrier frequency offset with a maximum accuracy of +/−500 KHz can be estimated by use of the correlation between the locations of the above-mentioned 384 subcarriers according to P1.

In addition, the Implementation Guidelines mentioned above describes that a "fine" carrier frequency offset with an accuracy of +/−0.5 subcarrier interval can be estimated by the cyclic structure of P1.

It should be noted here that, with a receiving apparatus configured to receive OFDM signals of DVB-T2, the demodulation of P1 signaling and the estimation of guard interval length are executed in the T2 frame in which P1 was first detected at the time of so-called channel scan.

Next, the receiving apparatus recognizes the FFT size of P2, thereby enabling the detection of the start position of the FFT computation of P2 of the next T2 frame. Then, the receiving apparatus executes the FFT computation of P2 to enable the decoding of the L1 pre-signaling included in P2 and the decoding of an intended PLP (Physical Layer Pipe) via the decoding of the L1 post-signaling.

Consequently, MPEG streams can be captured as data of a predetermined program, for example.

SUMMARY OF THE INVENTION

However, the decoding of the L1 pre-signaling included in P2 desires the decoding of a bit train by orthogonally demodulating P1, for example. The correct decoding of information included in P1 desires the estimation of "coarse" carrier offset. Decoding the information included in P1 without the "coarse" carrier offset correction makes it highly possible to erroneously detect parameter S1, parameter S2 and so on.

For the above-mentioned reasons, until the estimation of the coarse carrier offset has been completed, an intended PLP of the frame received by this timing may not be decoded. The coarse carrier offset detection (or estimation) is executed by computing correlation values each time while shifting the frequency with preset intervals, for example, thereby taking a relatively long time.

Therefore, the embodiments of the present invention address the above-identified and other problems associated with related-art methods and apparatuses and solve the addressed problems by providing a receiving apparatus, a receiving method, and a receiving program that are configured to early execute the decoding of an intended PLP in an OFDM signal of DVB-T2.

In carrying out the invention and according to one mode thereof, there is provided a receiving apparatus.

This receiving apparatus has preamble analysis means configured to receiving a frame of DVB-T2 (Digital Video Broadcasting-Terrestrial 2) made up of an OFDM (Orthogonal Frequency Division Multiplexing) signal and analyze a preamble contained in the received frame; offset detection means configured to detect a fine offset and a coarse offset on the basis of the analyzed preamble; carrier frequency correction means configured to execute carrier frequency correction on an OFDM time domain signal obtained by quadrature demodulation on the basis of the detected fine offset and the detected coarse offset; determination means configured to determine whether the detection of the coarse offset has been completed; and control signal output means configured, if the detection of the coarse offset is determined to be completed, to output a control signal for feeding back the fine offset detected on the basis of an OFDM frequency domain signal obtained by FFT computation to the carrier frequency correction means.

In the receiving apparatus mentioned above, if the detection of the coarse offset is determined to be completed, the control signal output means further outputs a control signal for feeding back a sampling error detected on the basis of the OFDM frequency domain signal to sampling means configured to sample the OFDM time domain signal.

In the receiving apparatus mentioned above, if the detection of the coarse offset is determined to be completed, the control signal output means further outputs a control signal for starting processing associated with interpolation in time direction in equalization processing on the OFDM frequency domain signal.

In the receiving apparatus mentioned above, if a carrier frequency correction amount made up of the fine offset and the coarse offset obtained as a result of the detection by the offset detection means differs from a preset carrier frequency correction amount, the preamble is newly analyzed in a next frame based on DVB-T2.

In the receiving apparatus mentioned above, the frame based on DVB-T2 contains a preamble different from the preamble and predetermined signaling information contained in this different preamble is preset.

In the receiving apparatus mentioned above, a carrier frequency correction amount made up of the fine offset and the coarse offset obtained as a result of past reception is further preset.

In carrying out the invention and according to another mode thereof, there is provided a receiving method. This receiving method has the steps of executed by preamble analysis means, receiving a frame of DVB-T2 (Digital Video Broadcasting-Terrestrial 2) made up of an OFDM (Orthogonal Frequency Division Multiplexing) signal and analyzing a preamble contained in the received frame; executed by offset detection means, detecting a fine offset and a coarse offset on the basis of the analyzed preamble; executed by determination means, determining whether the detection of the coarse offset has been completed; and if the detection of the coarse offset is determined to be completed, executed by control signal output means, outputting a control signal for feeding back the fine offset detected on the basis of an OFDM frequency domain signal obtained by FFT computation to carrier frequency correction means for executing carrier frequency correction on an OFDM time domain signal.

In carrying out the invention and according to still another mode thereof, there is provided a computer program configured to make a computer function as a receiving apparatus. This receiving apparatus has preamble analysis means for receiving a frame of DVB-T2 (Digital Video Broadcasting-Terrestrial 2) made up of an OFDM (Orthogonal Frequency Division Multiplexing) signal and analyzing a preamble contained in the received frame; offset detection means for detecting a fine offset and a coarse offset on the basis of the analyzed preamble; carrier frequency correction means for executing carrier frequency correction on an OFDM time domain signal obtained by quadrature demodulation on the basis of the detected fine offset and the detected coarse offset; determination means for determining whether the detection of the coarse offset has been completed; and control signal output means for, if the detection of the coarse offset is determined to be completed, outputting a control signal for feeding back the fine offset detected on the basis of an OFDM frequency domain signal obtained by FFT computation to the carrier frequency correction means.

In one mode of the present invention, a DVB-T2 frame made up of OFDM signals is received. A preamble contained in the received frame is analyzed. On the basis of the analyzed preamble, a fine offset and a coarse offset are detected. Whether or not the detection of the coarse offset has been completed is determined. If the coarse offset is determined having been completed, then a control signal for feeding back the fine offset detected on the basis of an OFDM frequency domain signal obtained by FFT computation to carrier frequency correction means configured to execute carrier frequency correction of an OFDM time domain signal.

As described above and according to embodiments of the present invention, the decoding of an intended PLP can be early executed in an OFDM signal based on DVB-T2.

BRIEF DESCRIPTION OF THE DRAWINGS

FIG. 5 shows information necessary for the lock-in of DVB-T2 synchronism;

FIG. 6 shows information necessary for the lock-in of DVB-T2 synchronism;

FIG. 7 is a diagram explaining a processing time desired for enabling the decoding of an intended PLP when presetting is on;

FIG. 14 is a block diagram illustrating an exemplary configuration of a personal computer.

DETAILED DESCRIPTION OF THE PREFERRED EMBODIMENTS

This invention will be described in further detail by way of embodiments thereof with reference to the accompanying drawings.

First, DVB-T2 (the Second-generation European Terrestrial Digital Broadcasting standard) is described that is specified as a standard of the terrestrial digital broadcasting using OFDM. Because OFDM is highly resistant against multipath, OFDM is used in the terrestrial digital broadcasting and so on that are highly vulnerable to multipath interferences.

Figure 1:
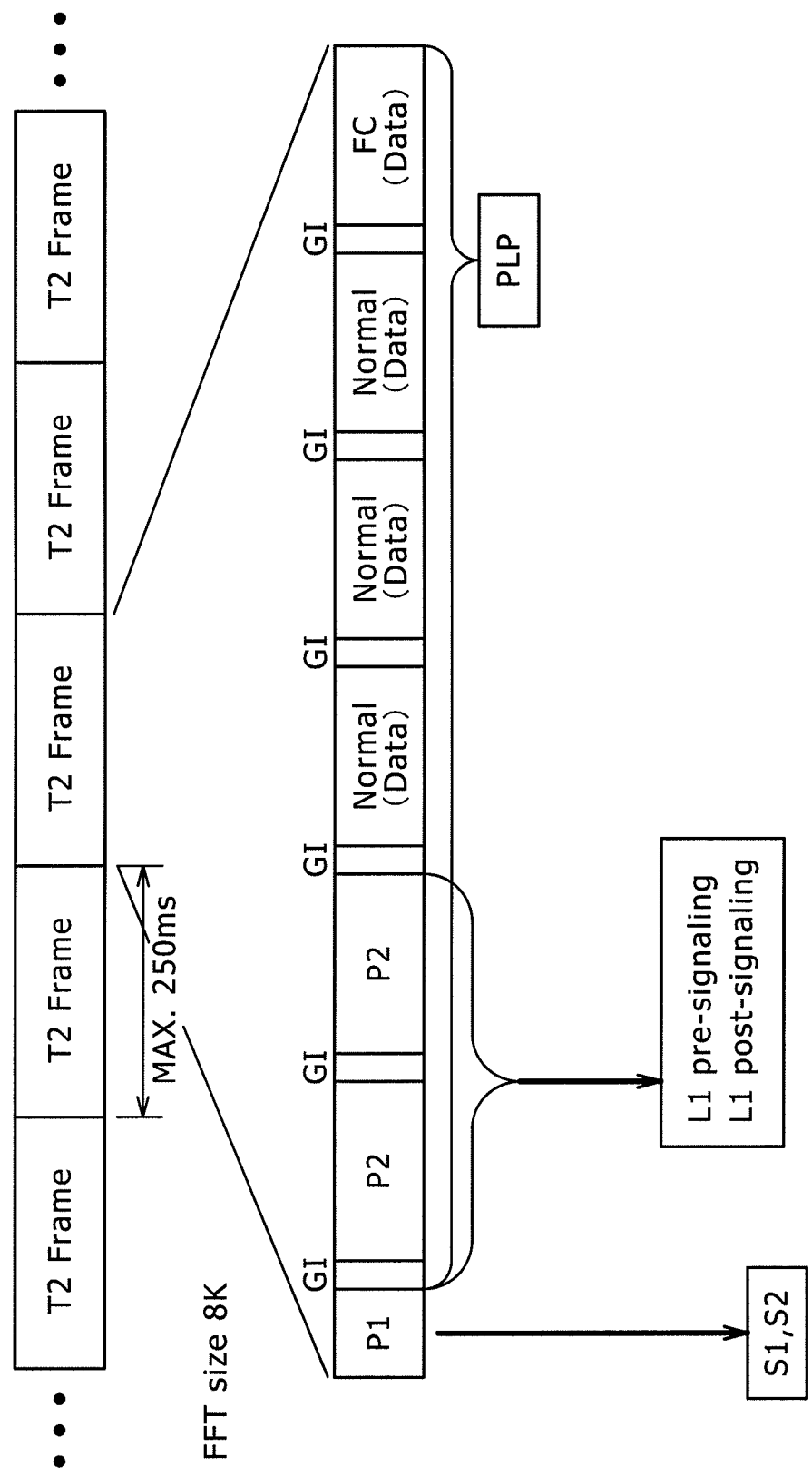
FIG. 1 is a diagram explaining a frame structure of DVB-T2.

Now, referring to FIG. 1, there is shown an exemplary configuration of DVB-T2 frames. As shown in the figure, in DVB-T2, data is transmitted in units of a transmission frame called a T2 frame. It should be noted that, in this figure, the horizontal axis represents time.

It should be noted that the data to be transmitted in DVB-T2 is OFDM-modulated before transmission. And the modulated data is transmitted on an OFDM symbol basis.

Namely, each T2 frame shown in FIG. 1 is a transmission frame (or an OFDM transmission frame) composed of two or more OFDM symbols.

In OFDM, many orthogonal subcarriers are arranged in the transmission band and digital modulations, such as PSK (Phase Shift Keying) and QAM (Quadrature Amplitude Modulation) are executed to allocate data to the amplitude and phase of each of these subcarriers.

In OFDM, the transmission band is divided by many subcarriers, so that the band per subcarrier (or wave) is relatively narrow and the modulation speed is relatively low; however, the total transmission speed (of the entire subcarriers) remains unchanged from related-art technologies.

As described above, in OFDM, data is allocated to two or more subcarriers, so that the modulation can be executed by the IFFT (Inverse Fast Fourier Transform) computation. Also, the demodulation of an OFDM signal obtained as a result of the modulation can be executed by the FFT (Fast Fourier Transform) computation.

One OFDM symbol is configured by a symbol (or data transmitted by one subcarrier) on the IQ constellation of each of the subcarriers. DVB-T2 specifies six types of 1K, 2K, 4K, 8K, 16K, and 32K as the number of symbols (or subcarriers) constituting one OFDM symbol, namely, FFT sizes. FIG. 1 shows an example of a T2 frame with the FFT size being 8K; in this case, one T2 frame is a maximum of 250 ms.

Generally, an OFDM symbol is configured by a valid symbol that is a signal period in which the IFFT is executed at the time of modulation and a guard interval in which the waveform of a part of the last half of this valid symbol is copied to the beginning of this valid symbol without change. It should be noted that "GI" shown in FIG. 1 is indicative of the guard interval.

Each T2 frame is configured by an OFDM symbol called P1 and P2, an OFDM symbol called "normal," and an OFDM symbol called FC (Frame Closing). Each of these OFDM symbols is configured to contain a pilot signal that is a known signal.

P1 and P2 are preamble signals that contain the information necessary for OFDM signal demodulation and so on.

The P1 symbol is a symbol for transmitting P1 signaling that contains transmission type and basic transmission parameters.

To be more specific, P1 signaling (P1) contains parameters S1, S2, and so on. The parameters S1 and S2 are indicative in which of the schemes, SISO (Single Input, Single Output (meaning one transmitting and one receiving antenna)) and MISO (Multiple Input, Single Output (meaning multiple transmitting antennas but one receiving antenna)) P2 is transmitted, an FFT size (the number of samples (or symbols) subject to one session of FFT computation) for FFT computation of P2, and so on.

Therefore, the demodulation of P2 desires the decoding of a bit train corresponding to parameters S1 and S2 by orthogonally demodulating P1 for example.

The P2 symbol is a symbol for transmitting L1 pre-signaling and L1 post-signaling.

The L1 pre-signaling includes information for a receiving apparatus configured to receive a T2 frame to receive and decode the L1 post-signaling. The L1 post-signaling includes parameters necessary for a receiving apparatus to access the physical layer (the layer pipes thereof).

A receiving apparatus configured to receive OFDM signals of DVB-T2 executes P1 signaling demodulation and guard interval length estimation in the T2 frame in which P1 was first detected at the time of so-called channel scan.

Next, the receiving apparatus recognizes the FFT size of P2, so that the receiving apparatus is able to detect the start position of the FFT computation of P2 of a next T2 frame. Then, the receiving apparatus executes the FFT computation of P2, thereby decoding the L1 pre-signaling contained in P2 and decoding an intended PLP (Physical Layer Pipe) via the decoding of the L1 post-signaling.

It should be noted that PLP is a unit in which payload data to be transmitted by each T2 frame is multiplexed. In the receiving apparatus, the payload data is multiplexed such that error correction is executed for each PLP. PLP is decoded on the basis of symbols contained in the OFDM symbol called normal and the OFDM symbol called P2 in each T2 frame.

Decoding an intended PLP allows the acquisition of an MPEG stream as the data of a predetermined program, for example.

It should be noted that, in the example shown in FIG. 1, two P2s are arranged in each T2 frame; however, 1 to 16 P2s of OFDM symbols may be arranged in each T2 frame.

The Implementation Guidelines (ETSI TR 102 831:IG) of DVB-T2 describes that, if the transmission band for transmitting OFDM signals is 8 MHz for example, a "coarse" carrier frequency offset with a maximum accuracy of +/−500 KHz can be estimated by use of the correlation between the locations of the 384 subcarriers of OFDM signal of P1 according to P1.

In addition, the Implementation Guidelines mentioned above describes that a "fine" carrier frequency offset with an accuracy of ±0.5 subcarrier interval can be estimated by the cyclic structure of P1.

Namely, in the reception of T2 frames in the receiving apparatus, it is desired to estimate the "fine" carrier frequency offset with an accuracy of ±0.5× subcarrier interval and the "coarse" carrier frequency offset with a maximum accuracy of ±500 KHz, thereby correcting these offsets. "Fine" carrier frequency offset is called a fine offset and "coarse" carrier frequency offset is called a coarse offset. The correction of these fine offset and coarse offset is called carrier frequency correction.

Figure 2:
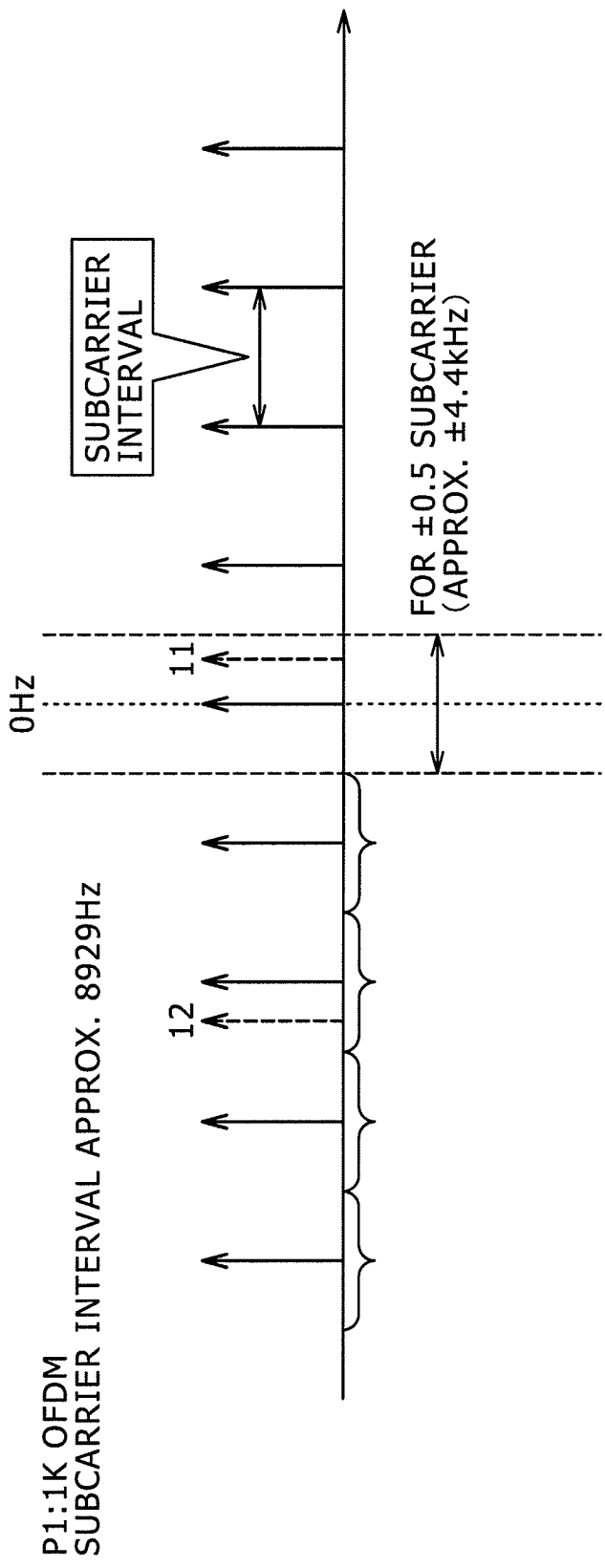
FIG. 2 is a diagram explaining carrier frequency correction in OFDM.

Referring to FIG. 2, there is shown a diagram explaining the carrier frequency correction in OFDM.

FIG. 2 shows carrier frequency correction that is executed with P1 having an FFT size of 1K used for an example. The horizontal axis represents the frequency of each subcarrier. The OFDM symbol of P1 having an FFT size of 1K has 1024 symbols as valid symbols. P1 has a cyclic structure in which a signal obtained by frequency-shifting a part of the beginning side of a valid symbol is copied to the front side of the valid symbol and a signal obtained by frequency-shifting the remaining part of the valid symbol to the rear side of the valid symbol. The cyclic structure of P1 allows the estimation of the carrier shift between ±0.5× subcarrier intervals.

P1 has 853 subcarriers as valid subcarriers. Of these 853 subcarriers, DVB-T2 locates information to 384 subcarriers. Referring to FIG. 2, each solid-line arrow represents a subcarrier.

In the case of P1 with the FFT size thereof being 1K, the interval between frequencies of adjacent subcarriers is approximately 8929 Hz. Therefore, the ±0.5× subcarrier interval is approximately ±4.4 KHz.

For example, if a subcarrier is detected at a dashed-line arrow in the figure, the frequency of the difference between the frequency of an arrow 11 and 0 Hz is the frequency offset of this subcarrier. In this case, there is a frequency offset for approximately 0.3 subcarrier. Such a frequency offset can be detected as a fine offset.

Also, for example, if a subcarrier is detected at a dashed-line arrow 12 shown in the figure, the frequency of the difference between the frequency of the arrow 12 and 0 Hz is the frequency offset of this subcarrier. In this case, there is a frequency offset for approximately 2.3 subcarriers.

In this case, a difference in the frequency from the arrow 12 to the nearest subcarrier, namely, a frequency offset for 0.3 subcarrier, is detected as a fine offset. Then, a frequency offset for two subcarriers is detected as a coarse offset. The coarse offset detection is executed by computing a correlation value every time the frequency is shifted at predetermined intervals about several hundred times, for example.

Thus, by the carrier frequency correction executed at the time of receiving T2 frames in the receiving apparatus, the data transmitted by each subcarrier can be accurately received.

Figure 3:
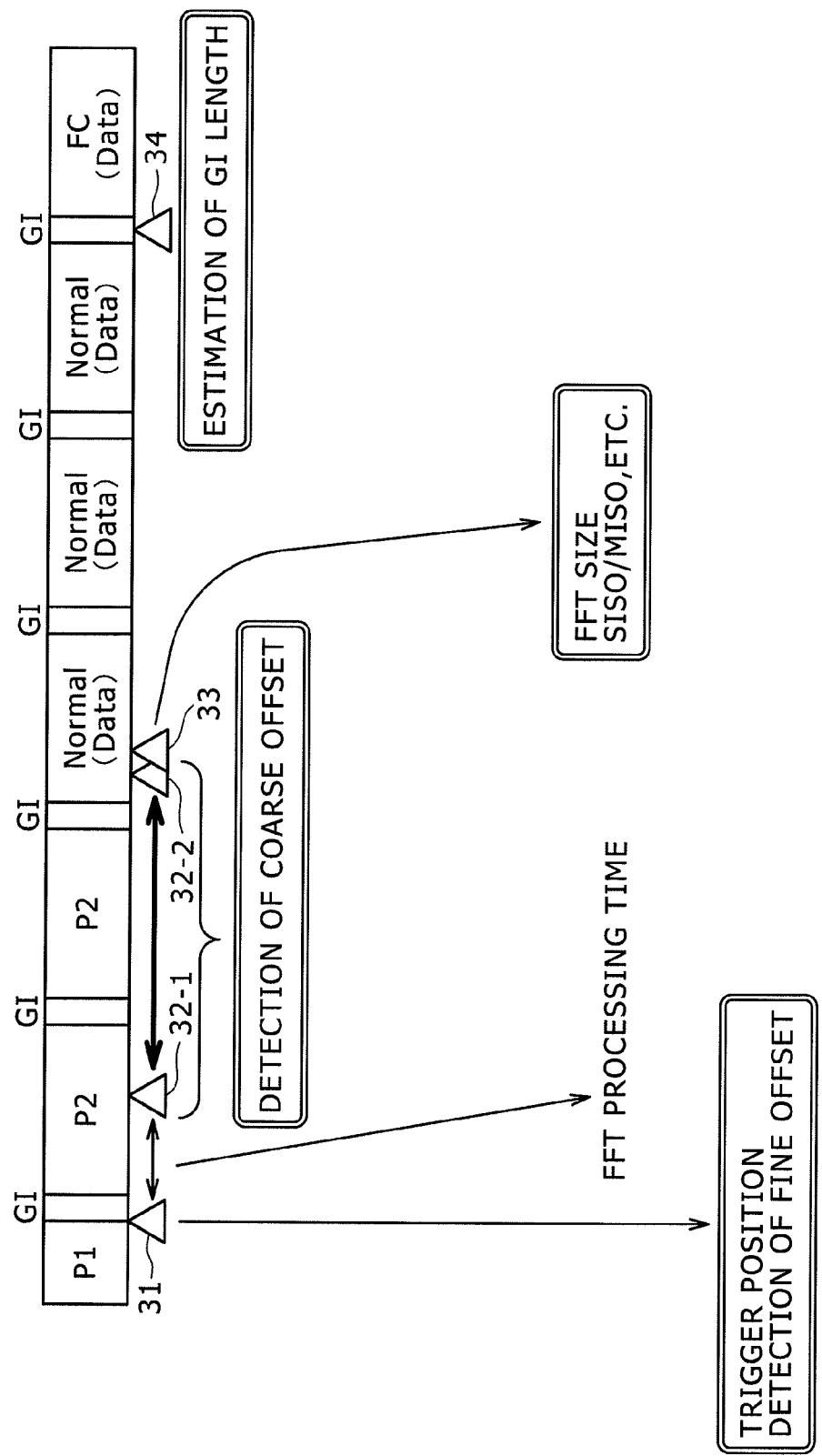
FIG. 3 is a diagram explaining a processing time desired for enabling the decoding of an intended PLP in a receiving apparatus.
Figure 4:
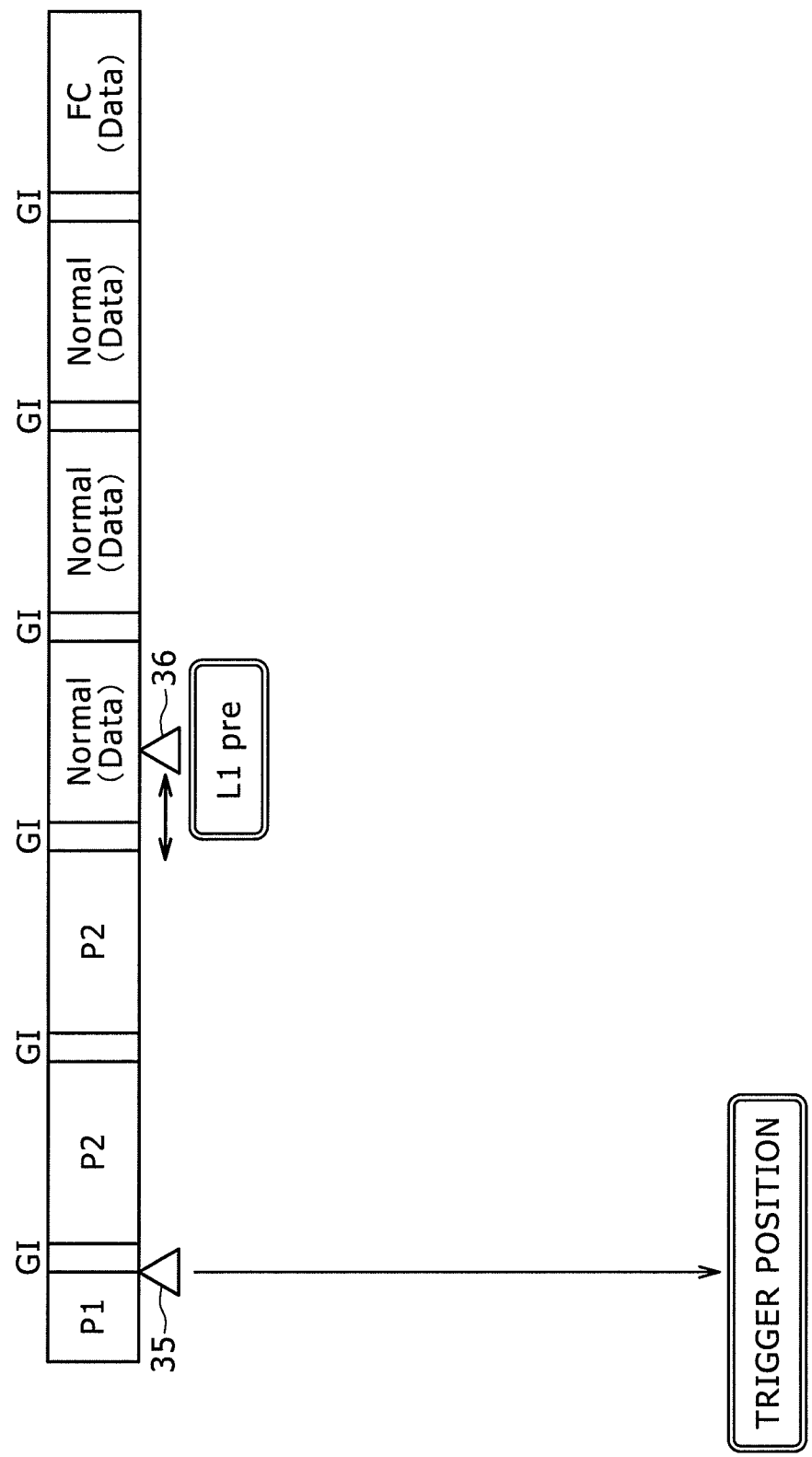
FIG. 4 is another diagram explaining a processing time desired for enabling the decoding of the intended PLP in a receiving apparatus.

FIG. 3 and FIG. 4 explain a time necessary for the decoding of an intended PLP to be enabled in the receiving apparatus. It should be noted that, in FIG. 3 and FIG. 4, the horizontal axis represents time and each triangle represents a predetermined point of time.

FIG. 3 shows the first frame of the T2 frames received by the receiving apparatus. FIG. 4 shows the second frame of the T2 frames received by the receiving apparatus.

Triangle 31 shown in FIG. 3 represents a trigger detection point of time that is the start position of a symbol (namely, P2) following P1. It should be noted that almost the same time the trigger position is detected, the detection of a fine offset is completed.

Triangles 32-1 and 32-2 shown in FIG. 3 represent a point of time at which coarse offset detection has been completed.

It should be noted that the detection of a coarse offset is executed by computing correlation values every time the frequency is shifted at predetermined intervals about several hundred times for example, so that, unlike the case of a fine offset, the completion of the detection takes time. In addition, depending upon how the apparatus is mounted, the time necessary for coarse offset detection varies. Hence, the detection of a coarse offset is completed at the point of time 32-1 in the earliest case and at the point of time 32-2 in the latest case.

It should be noted that the time it takes from symbol 31 to symbol 32-1 is a time desired for the FFT computation of P1.

Symbol 33 shown in FIG. 3 represents a point of time at which the quadrature demodulation of P1 and the decoding of a bit train are completed and the acquisition of the information containing parameter S1, parameter S2, and so on is completed. Namely, at the point of time of symbol 33, the information indicative in which of schemes, SISO and MISO, P2 is transmitted, the FFT size for use in the FFT computation of P2, and so on is acquired.

As described above, in order to correctly receive the data transmitted by each subcarrier, carrier frequency correction has to be done. Hence, the quadrature demodulation of P1 and the demodulation of a bit train are completed upon passing of a predetermined time after the completion of coarse offset detection. It should be noted that symbol 33 shown in FIG. 3 is shown as indicative of the completion of the coarse offset detection at the point of time of symbol 32-2.

Symbol 34 shown in FIG. 3 is indicative of the point of time at which the estimation of a guard interval (GI) is completed. As described above, in the receiving apparatus, guard interval length estimation is executed in the T2 frame in which P1 has been detected. The GI length estimation is completed after the acquisition of the FFT size and then n OFDM symbols are received. It should be noted that n denotes the number of OFDM symbols that are desired depending on the specifications and performance of the receiving apparatus. In the example shown in FIG. 3, it is assumed that the GI length estimation has been completed after the acquisition of the FFT size and after the reception of two OFDM symbols.

As described above, because the GI length estimation has not been completed until the point of time of symbol 34, P2 of the first frame of the T2 frame received by the receiving apparatus may not be demodulated. This is because the demodulation of P2 desires the execution of FFT computation of the valid symbol of P2 by executing GI length estimation in addition to trigger position detection.

For this purpose, the demodulation of P2 is executed on the second frame of the T2 frame received by the receiving apparatus.

Symbol 35 shown in FIG. 4 is indicative of the detection point of time of the trigger position of the second frame of the T2 frame received by the receiving apparatus.

In the case of the example shown in FIG. 4, because the GI length estimation has been completed at the point of time the symbol 34 shown in FIG. 3, P2 can be demodulated.

As described above, P2 contains L1 pre-signaling. L1 pre-signaling contains the information for the receiving apparatus for receiving T2 frames to execute the reception and demodulation of L1 post-signaling.

At the point of time of the symbol 36 shown in FIG. 4, the demodulation of P2 is completed to acquire L1 pre-signaling and then the acquisition of L1 post-signaling is enabled. It should be noted that the arrows to the left side of the symbol 36 shown in FIG. 4 represent a time desired for the demodulation of the second P2 and the acquisition of L1 pre-signaling.

Therefore, after the point of time of the symbol 36, it can be said that the preparation for the demodulation of an intended PLP has been completed. However, at the point of time of the symbol 36, P1 of the second frame, the first P2, the second P2 and a part of a normal OFDM symbol have already passed. As described above, PLP is decoded on the basis of some symbols included in the OFDM symbol called normal of a T2 frame and the OFDM symbol called P2, so that PLP may not be decoded on the second frame.

Consequently, the decoding of an intended PLP is enabled on the third frame and on. That the decoding of an intended PLP is enabled is referred to as pull-in of synchronism. Namely, in related-art technologies, the pull-in of synchronism of DVB-T2 desires two frames.

However, it is also practicable to store the information necessary for the pull-in of synchronism in the receiving apparatus in advance. Storing this information in the received apparatus is hereafter referred to as preset.

FIG. 5 and FIG. 6 show tables explaining the information necessary for the pull-in of synchronism of DVB-T2, the source of this information, and whether the preset of this information is allowed or not.

FIG. 5 is a table associated with the information necessary for the demodulation of P2.

As shown in the figure, the demodulation of P2 desires an FFT size. As described above, an FFT size can be obtained by demodulating P1. Also, an FFT size is contained in L1 pre-signaling.

In addition, the demodulation of P2 desires information SISO/MISO indicative in which of SISO or MISO P2 is transmitted. As described above, SISO/MISO information can be obtained by orthogonally demodulating P1 to decode a bit train. Also, SISO/MISO information is contained in L1 pre-signaling.

Further, the demodulation of P2 desires information "Mixed/Not Mixed" indicative in which of "Mixed" or "Not Mixed" P2 is transmitted. "Mixed/Not Mixed" information can be obtained by orthogonally demodulating P1 to decode a bit train. Also, "Mixed/Not Mixed" information is contained in L1 pre-signaling.

The demodulation of P2 desires GI length. As described above, In a T2 frame in which P1 has been detected, GI length is estimated. After the acquisition of FFT size, the GI length estimation is completed upon reception of n symbols after the acquisition of an FFT size. Namely, GI length is estimated by computing correlation values of guard intervals of each OFDM symbol. It should be noted however that GI length is also contained in L1 pre-signaling.

Further, the demodulation of P2 desires a trigger position. As described above, a trigger position is a start position for a symbol (namely, P2) following P1 and is detected by the receiving apparatus that has received a T2 frame.

Also, the demodulation of P2 desires a fine offset. As described above, a fine offset is detected by the receiving apparatus that has received a T2 frame on the basis of the cyclic structure of P1.

In addition, the demodulation of P2 desires a coarse offset. As described above, a coarse offset is detected by the receiving apparatus that has received a T2 frame by computing a correlation value every time the frequency is shifted at predetermined intervals, for example.

The FFT size, SISO/MISO, Mixed/Not Mixed, and GI length shown in FIG. 5 can also be preset. This is because these items of information are contained in L1 pre-signaling from the beginning.

On the other hand, the trigger position and the fine offset shown in FIG. 5 may not be expected to provide preset effects.

This is because these items of information are detected by the receiving apparatus that has received a T2 frame.

To be more specific, a fine offset typically causes minute variations due to the temperature characteristic and so on of the receiving apparatus, so that a fine offset need to be detected again even if the fine offset is preset.

Likewise, a coarse offset is also detected by the receiving apparatus that has received a T2 frame. However, as described above, a coarse offset provides a value that becomes an integral multiple of carrier interval. As compared with a fine offset, the possibility is considered low that the value of a coarse offset will be changed due to conditions of the receiving apparatus. For example, in a broadcast channel of DVB-T2, the possibility is considered low that a coarse offset value of a broadcast channel in which the pull-in of synchronism has been once completed will change thereafter.

Namely, a coarse offset is regarded to have no error if a deviation between a preset value and an actual error at the completion of the pull-in of synchronism is within a range of ±4.4 KHz, so that preset effects can be expected in many cases.

The above consideration indicates that the coarse offset shown in FIG. 5 is detected by the receiving apparatus that has received a T2 frame in principle, but this offset can also be preset. For example, in broadcast channels of DVB-T2 received in the past, the coarse offset of the broadcast channel in which the pull-in of synchronism has once completed may preset. It should be noted however that the preset coarse offset is not necessarily be a proper value.

FIG. 6 shows the table associated with the information desired for the demodulation of all OFDM symbols of T2 frame. The information items, FFT size through coarse offset, shown in the figure are substantially the same as those described above with reference to FIG. 5, so that the description thereof is skipped.

The demodulation of all OFDM symbols of each T2 frame desires the information indicative of the presence or absence of extended band, the number of data symbols, a pilot pattern, and tone reservation. These items of information are also contained in L1 pre-signaling and therefore can be preset.

Therefore, presetting the information contained in L1 pre-signaling, for example, completes the pull-in of synchronism at the point of time indicated by symbol 32-1 through the point of time indicated by symbol 32-2 described above with reference to FIG. 3. Namely, if the information contained in L1 pre-signaling is known, the receiving apparatus is able to demodulate all OFDM symbols starting from the second frame and decode an intended PLP starting from the second frame.

Further, in addition to the information contained in L1 pre-signaling, presetting a coarse offset allows the completion of the pull-in of synchronism at the point of time indicated by symbol 31 described above with reference to FIG. 3. This allows the demodulation of all OFDM symbols starting from the first frame and the decoding of an intended PLP starting from the first frame.

It should be noted however that, as described above, the preset coarse offset is not necessarily be proper.

Figure 7:
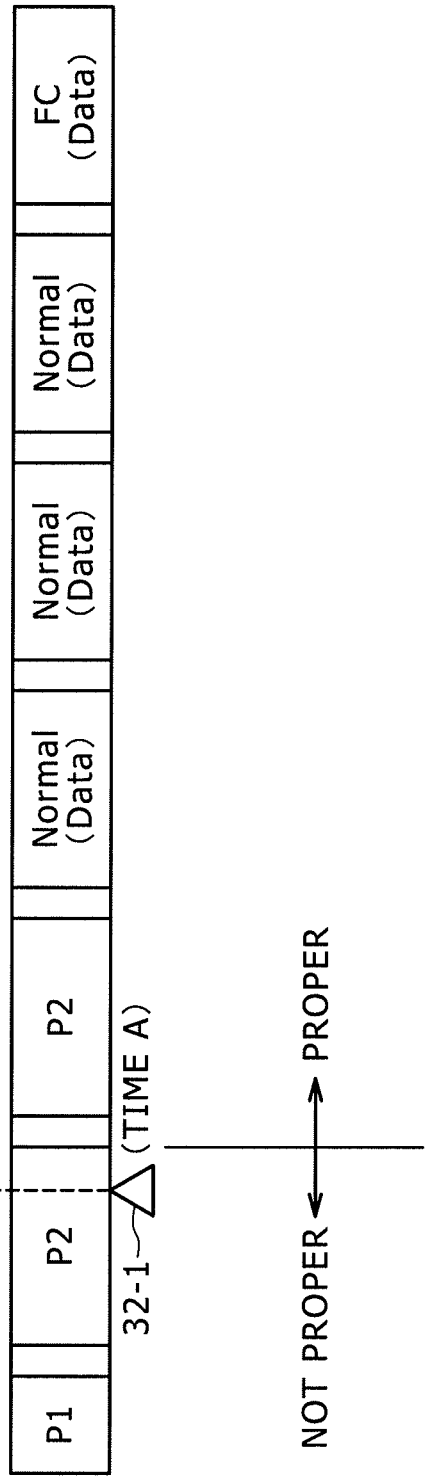

FIG. 7 is a diagram explaining a time desired for enabling the decoding of an intended PLP in the receiving apparatus. FIG. 7 corresponds to FIG. 3, in which the horizontal axis represents time and the triangle represents a predetermined point of time.

Assume here that, in the case where a coarse offset is preset in addition to the information contained in L1 pre-signaling the detection of the coarse offset has been completed at the point of time (hereafter referred to as time A) indicated by symbol 32-1 shown in FIG. 7 for example. In this example, it is assumed that the preset coarse offset is not proper.

In the receiving apparatus, carrier frequency correction may not be executed before time A as shown in FIG. 7; after time A, however, carrier frequency correction can be executed.

Therefore, of the T2 frames received by the receiving apparatus, the OFDM symbols after the second P2 can be FFT-computed after carrier frequency correction, thereby executing the demodulation properly. On the other hand, of the T2 frames received by the receiving apparatus, the OFDM symbols of P1 and the first P2 may not be FFT-computed after carrier frequency correction. Therefore, if P1 and the first P2 are demodulated, the result of the demodulation is improper.

In the receiving apparatus, equalization processing according to the characteristics of a transmission channel is executed on the basis of a pilot symbol contained in each OFDM symbol. In addition, the feedback of fine offset and the feedback of sampling error are executed. For example, if equalization processing or the feedbacks of fine offset and sample error is executed on the basis of the improper result of the demodulation, the demodulation of the subsequent OFDM symbols becomes difficult. To be specific, if equalization processing or the feedbacks of fine offset and sample error is executed on the basis of the improper result of the demodulation, the pull-in of synchronism has to be redone from the beginning, for example.

As described above, presetting a coarse offset in addition to the information contained in L1 pre-signaling can increase the speed of pull-in of synchronism. On the other hand, if the preset coarse offset is not proper, the pull-in of synchronism has to be redone from the beginning, so that there occurs a risk of lowering the processing speed.

Therefore, in the embodiments of the present invention, a coarse offset is preset in addition to the information contained in L1 pre-signaling and parts of processing associated with equalization and feedback are suspended until the detection of the coarse offset is completed.

It should be noted that, actually, the value itself of a coarse offset is not preset, but the carrier frequency correction amount made up of fine offset and coarse offset are preset. It should also be noted that, as described above, because a fine offset typically causes a minute variations due to the temperature characteristic and so on of the receiving apparatus, if a fine offset has been preset, the re-detection of the fine offset becomes indispensable.

Figure 8:
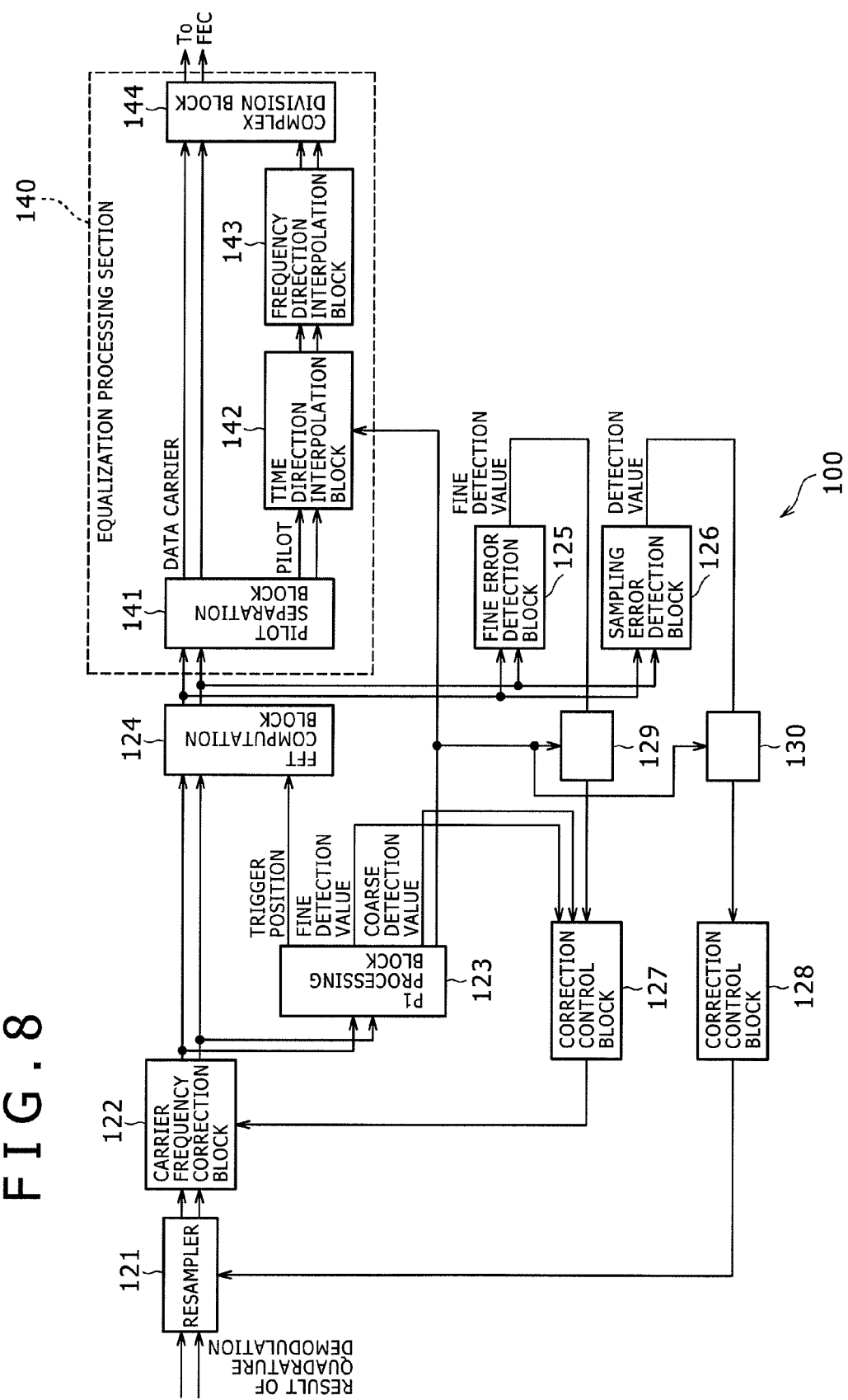
FIG. 8 is a block diagram illustrating an exemplary configuration of a receiving apparatus practiced as one embodiment of the invention.

FIG. 8 is a block diagram illustrating an exemplary configuration of a receiving apparatus practiced as one embodiment of the invention. A receiving apparatus 100 shown in the figure is configured as a receiving apparatus for receiving digital broadcasts based on DVB-T2, for example.

To a quadrature demodulation block, not shown, of the receiving apparatus 100, an OFDM signal (an IF (Intermediate Frequency) signal thereof) is supplied from a transmission apparatus. The quadrature demodulation block digitally orthogonally demodulates a supplied OFDM signal by use of a carrier (ideally the same carrier as used by the transmission apparatus) having a predetermined frequency (or a carrier frequency) and signal that is orthogonal to this carrier, thereby outputting a resultant baseband OFDM signal as a demodulation result.

It should be noted that the signal outputted as a result of the demodulation is a signal in the time domain before FFT computation by an FFT computation block 124 to be described later is executed (immediately after the IFFT computation on a symbol (data to be transmitted by one subcarrier) on IQ constellation in the transmission apparatus). This signal is hereafter referred to also as an OFDM time domain signal.

An OFDM time domain signal is a complex signal represented by a complex number including I (In-phase) component and Q (Quadrature phase) component.

The OFDM time domain signal outputted as a demodulation result is supplied to an A/D conversion block, not shown, to be converted into a digital signal, which is supplied to a resampler 121. The resampler 121 finely adjusts the digital signal obtained as a result of the conversion so as to synchronize a sampling rate with the clock of the transmission apparatus.

A carrier frequency correction block 122 executes carrier frequency correction on the signal outputted from the resampler 121. A corrected signal from the carrier frequency correction block 122 is supplied to a P1 processing block 123 and the FFT computation block 124.

The P1 processing block 123 is a functional block configured to acquire the signal outputted from the carrier frequency correction block 122 that is a signal corresponding to the OFDM symbol of P1 and detect a trigger position, a fine offset, and a coarse offset.

The P1 processing block 123 is also configured to output control signals that control a switch 129, a switch 130, and a time direction interpolation block 142 to be described later.

The FFT computation block 124 is a functional block configured to execute FFT computation on each OFDM symbol on the basis of a signal indicative of a trigger position supplied from the P1 processing block 123. In accordance with the supplied trigger position, the FFT computation block 124 extracts OFDM time domain signals (samples thereof) for the FFT size from the OFDM time domain signals to execute FFT computation.

Consequently, ideally, a symbol having a valid symbol length obtained by subtracting a guard interval (a symbol thereof) from symbols constituting one OFDM symbol included in an OFDM time domain signal is extracted from the OFDM time domain signal of an FFT section and the extracted signal is FFT-computed.

By the FFT computation on the OFDM time domain signal by the FFT computation block 124, the information transmitted by subcarrier, namely, the OFDM signal representing a symbol on IQ constellation can be obtained.

It should be noted that the OFDM signal obtained by the FFT computation on the OFDM time domain signal is a frequency domain signal and is hereafter referred to also as an OFDM frequency domain signal.

A computation result obtained by the FFT computation block 124 is supplied to an equalization processing section 140, a fine error detection block 125, and a sampling error detection block 126.

On the basis of an OFDM frequency domain signal obtained by the FFT computation, the fine error detection block 125 newly detects a fine offset and supplies the detected fine offset to a correction control block 127.

On the basis of the fine offset detected by the fine error detection block 125, the correction control block 127 corrects the error of the fine offset detected by the P1 processing block 123 and supplies the carrier frequency correction amount to the carrier frequency correction block 122.

It should be noted that the switch 129 is arranged between the fine error detection block 125 and the correction control block 127.

On the basis of the OFDM frequency domain signal obtained by FFT computation, the sampling error detection block 126 detects a sampling error and supplies the detected sampling error to a correction control block 128.

On the basis of the sampling error detected by the sampling error detection block 126, the correction control block 128 controls an operation of the resampler 121.

It should be noted that the switch 130 is arranged between the sampling error detection block 126 and the correction control block 128.

The equalization processing section 140 is a functional block configured to execute equalization processing in accordance with the characteristics of a transmission channel on the basis of the pilot symbol contained in each OFDM symbol of an OFDM frequency domain signal.

A pilot symbol is used for the estimation of transmission characteristics by the receiving apparatus 100; for example, scattered pilot symbols called SP (Scattered Pilot) are allocated to subcarriers.

Figure 9:
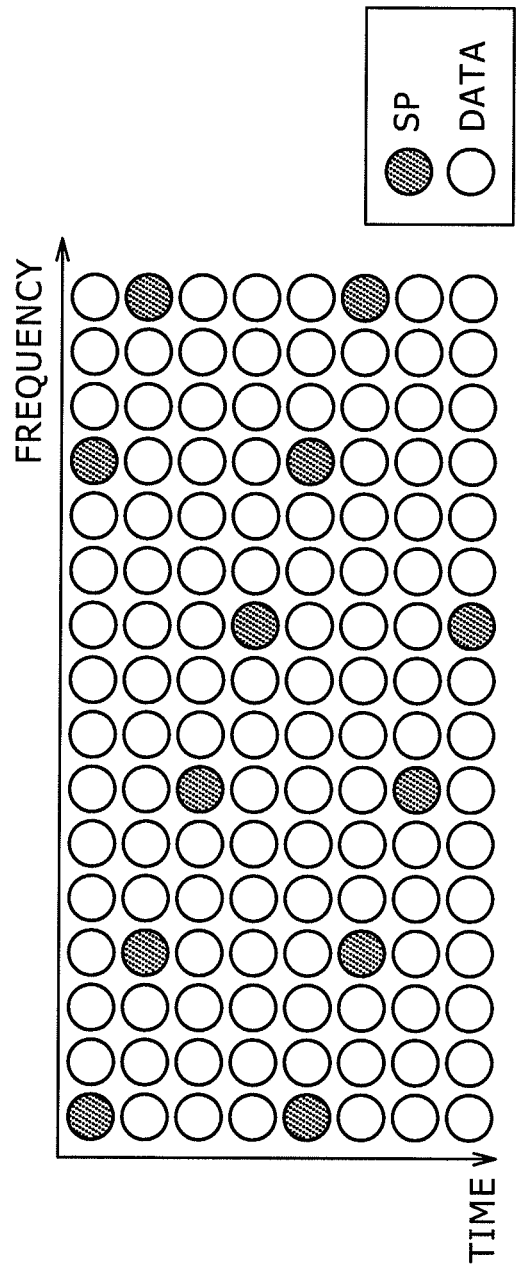
FIG. 9 is a diagram explaining SP arrangement and equalization processing in an OFDM symbol.
Figure 10:
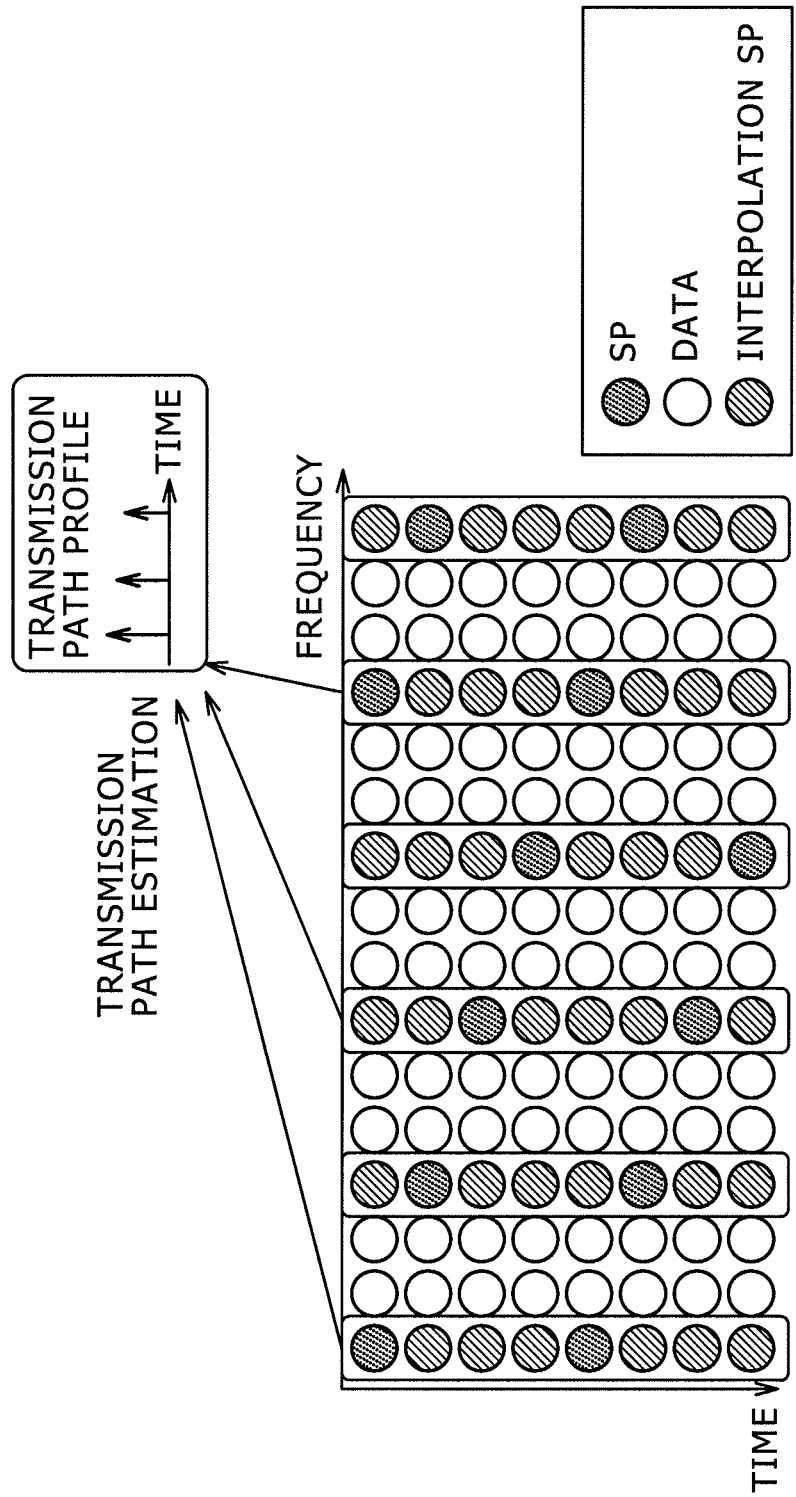
FIG. 10 is another diagram explaining SP arrangement and equalization processing in an OFDM symbol.
Figure 11:
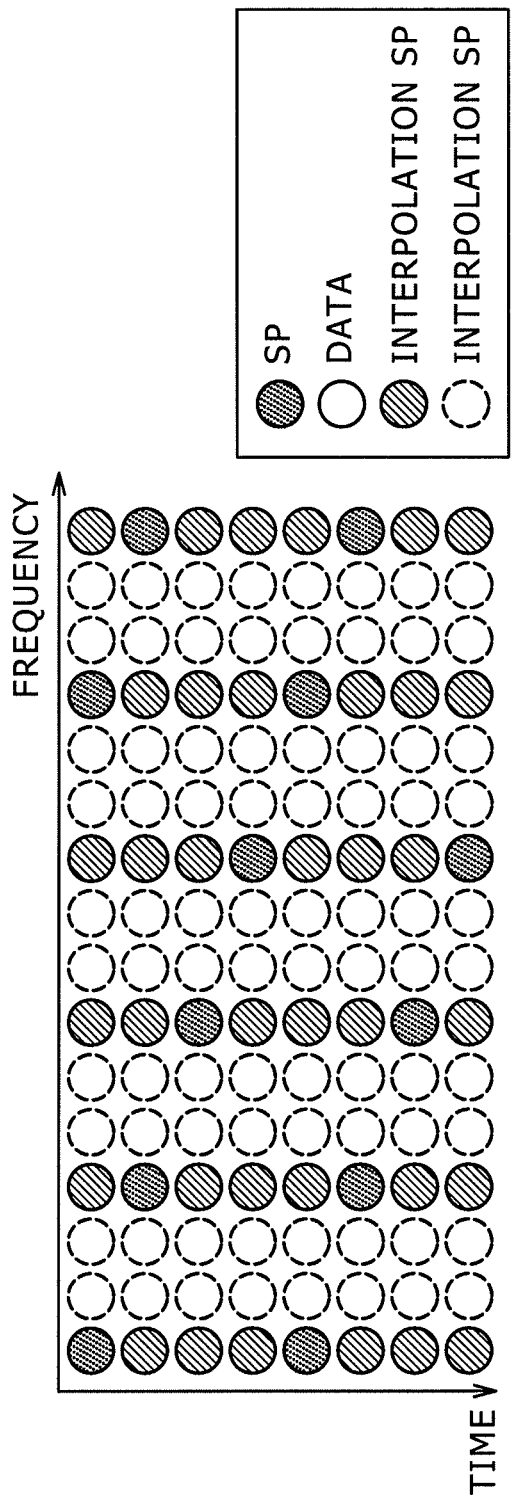
FIG. 11 is still another diagram explaining SP arrangement and equalization processing in an OFDM symbol.

FIG. 9 through FIG. 11 explain the arrangement of SP in each OFDM symbol and equalization processing. It should be noted that, in FIG. 9 through FIG. 11, the horizontal axis represents frequency and the vertical axis represents time.

In FIG. 9 through FIG. 11, one circle represents a symbol transmitted by one subcarrier. Therefore, a row of circles along the horizontal axis correspond to one OFDM symbol. Each white circle represents data (or a carrier wave) subject to transmission. Each black circuit represents an SP. Each hatched circle or each dashed-line circle represents an interpolated SP.

Each SP shown in FIG. 9 is a complex vector having known amplitude and phase. Between an SP and another, a data carrier wave subject to transmission is arranged. In the receiving apparatus 100, each SP is obtained in a distorted state caused by the influence of transmission path characteristic. By comparing this SP at the time of reception with a known SP at the time of transmission, the transmission path characteristic at the position of SP can be obtained.

On the basis of the transmission path characteristic at the position of SP, the equalization processing section 140 executes interpolation along the time direction to generate interpolated SPs as shown in FIG. 10. By comparing the data at the time of reception with the SP interpolated in the time direction, the equalization processing section 140 estimates the transmission path characteristic for each symbol.

In addition, by executing frequency interpolation filtering, the equalization processing section 140 executes interpolation along the frequency direction to generate SPs interpolated along the frequency direction as shown in FIG. 11. Consequently, the transmission path characteristics of the frequency direction of all subcarriers are estimated.

To be more specific, in the interpolation along the time direction, interpolation is executed on the symbol transmitted by the same subcarrier as the SP in each of two or more OFDM symbols on the basis of each SP. In the interpolation along the frequency direction, the symbol transmitted by each subcarrier in the same OFDM symbol is interpolated on the basis of each SP.

By executing complex division on the FFT-computed signal by the estimated transmission path characteristic, the equalization processing section 140 can equalize the signal transmitted thereto.

Now, referring to FIG. 8 again, the equalization processing section 140 is configured by a pilot separation block 141, the time direction interpolation block 142, a frequency direction interpolation block 143, and a complex division block 144.

The pilot separation block 141 is configured to extract a subcarrier signal on which a pilot symbol is transmitted from an OFDM frequency domain signal obtained by the processing of the FFT computation block 124. Then, the pilot separation block 141 supplies the subcarrier signal on which the pilot symbol is transmitted to the time direction interpolation block 142 and supplies other subcarrier signals to the complex division block 144.

The time direction interpolation block 142 is a functional block configured to execute the processing associated with the interpolation in the time direction among the equalization processing operations described above with reference to FIG. 9 through FIG. 11.

The frequency direction interpolation block 143 is a functional block configured to execute the processing associated with the interpolation in the frequency direction among the equalization processing operations described above with reference to FIG. 9 through FIG. 11.

The complex division block 144 complex-divides the subcarrier signal other than the subcarrier on which a pilot symbol is transmitted by the estimated transmission path characteristic as described above. This complex division allows the equalization of each signal transmitted to the equalization processing section 140.

Forward error correction (FEC) and so on are executed on the signal outputted from the complex division block 144 to be processed as image data or audio data, for example.

In addition, when the detection of a coarse offset has been completed, the above-mentioned P1 processing block 123 switches between the control signals that control the switch 129, switch 130, and the time direction interpolation block 142.

To be more specific, until the detection of a coarse offset is completed, the switch 129 is opened by the P1 processing block 123 and, after the detection is completed, the switch 129 is closed by the P1 processing block 123.

Until the detection of a coarse offset is completed, the switch 130 is opened by the P1 processing block 123 and, after the detection is completed, the switch 130 is closed by the P1 processing block 123.

Further, the P1 processing block 123 controls the time direction interpolation block 142 not to execute interpolation until the completion of the detection of a coarse offset and execute interpolation after the completion of the detection of the coarse offset. It should be noted that until the detection of a coarse offset is completed, the time direction interpolation block 142 outputs the signal supplied from the pilot separation block 141 to the frequency direction interpolation block 143 without change.

Figure 12:
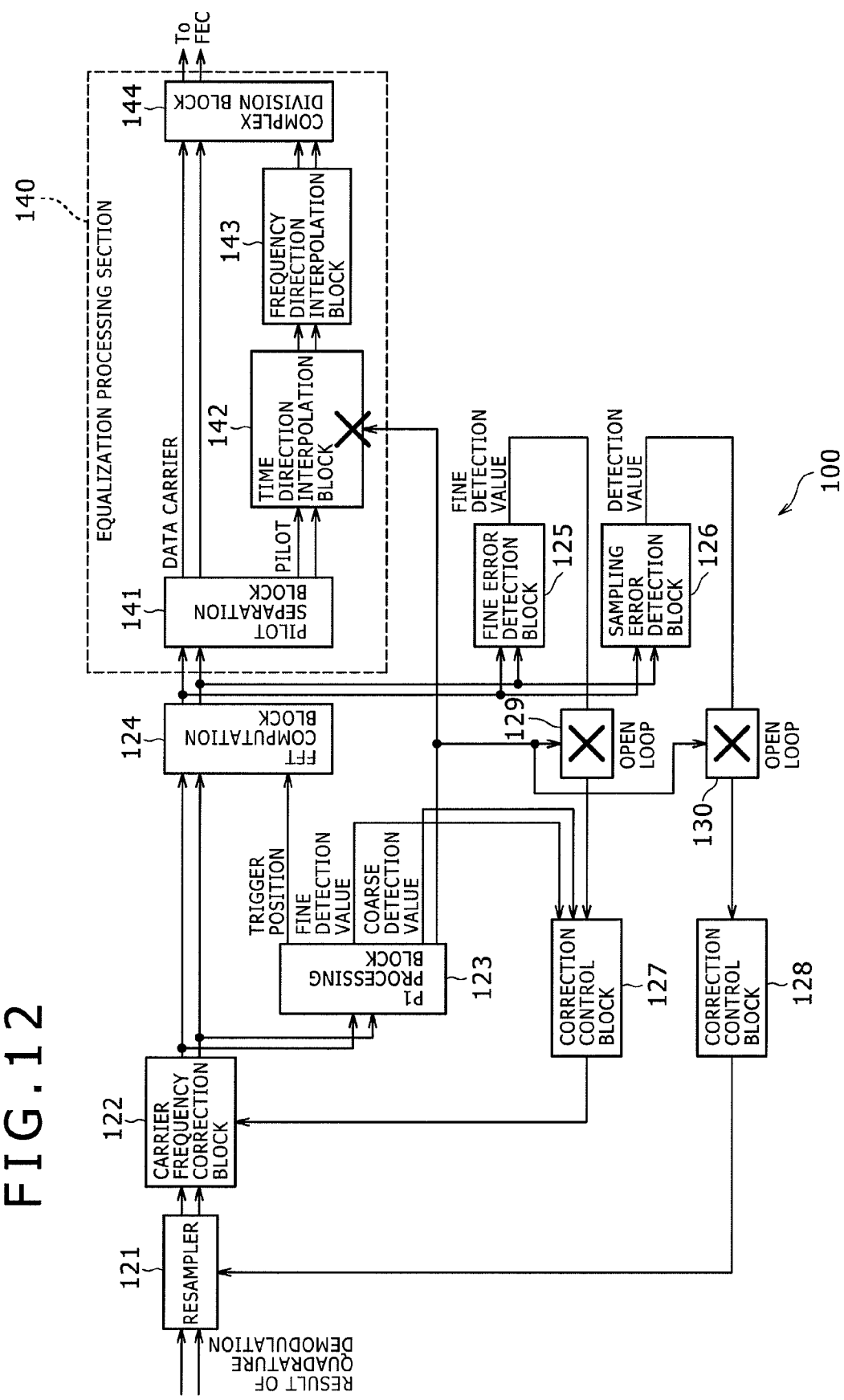
FIG. 12 is a diagram explaining an operation of the receiving apparatus shown in FIG. 8.

To be more specific, until the detection of a coarse offset is completed, the receiving apparatus 100 operates as shown in FIG. 12. It should be noted that FIG. 12 is a block diagram corresponding to FIG. 8. With reference to FIG. 12, components similar to those previously described with reference to FIG. 8 are denoted by the same reference numerals.

In FIG. 12, a switch 129, a switch 130, and a time direction interpolation block 142 are checked with x.

To be more specific, because the switch 129 opens until the detection of a coarse offset is completed, the loop associated with the correction of fine offset opens. Therefore, a fine offset based on the OFDM frequency domain signal obtained by FFT computation is not reflected onto the processing to be executed by the carrier frequency correction block 122.

By doing so, even if a preset coarse offset is not proper, a fine offset is prevented from being fed back on the basis of an improper demodulation result.

Further, because the switch 130 is open until the detection of a coarse offset is completed, the loop associated with the correction of sampling error opens. Therefore, a sampling error detected on the basis of an OFDM frequency domain signal obtained by FFT computation is not reflected onto the processing to be executed by the resampler 121.

By doing so, even if a preset coarse offset is not proper, a sampling error is prevented from being fed back on the basis of an improper demodulation result.

In addition, because the time direction interpolation block 142 does not execute interpolation until the detection of a coarse offset is completed, the equalization processing by the equalization processing section 140 is executed only by the interpolation along the frequency direction.

To be more specific, as described above with reference to FIG. 10, the interpolation along time direction is executed over two or more OFDM symbols, so that, if an interpolation based on a pilot symbol obtained as an improper result of demodulation, the equalization processing on the OFDM symbols received later fails. That is, the demodulation result of one OFDM symbol received earlier adversely affects the results of the demodulation of two or more OFDM symbols received later.

Hence, as shown in FIG. 12, the equalization processing by the equalization processing section 140 is executed only by the interpolation along the frequency direction. Consequently, even if the demodulation result of one OFDM symbol is improper, this improper result will not adversely affect the demodulation results of other OFDM symbols.

By doing so, even if a present coarse offset is improper, the execution of the equalization processing based on the improper demodulation result can be prevented.

Figure 13:
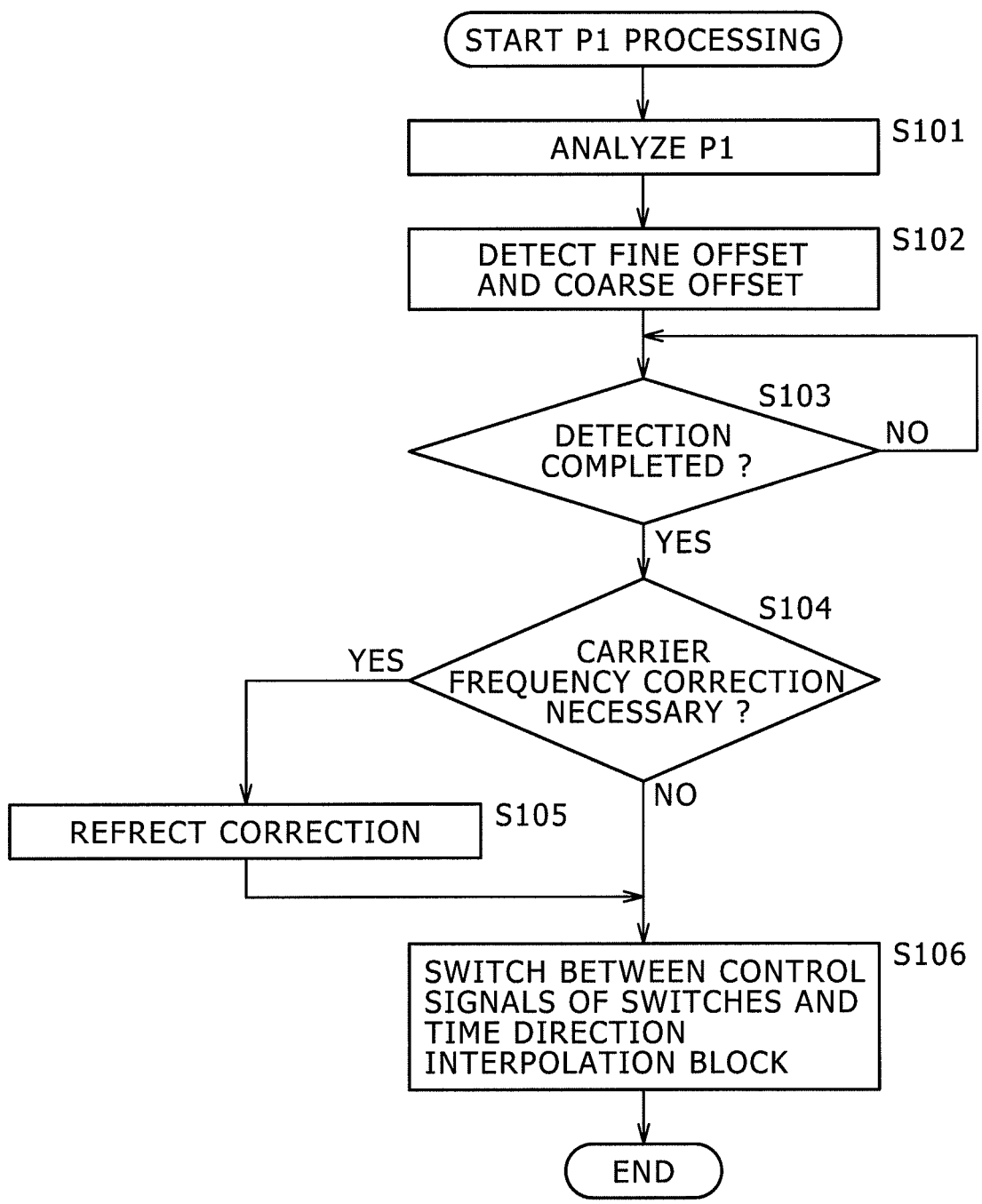
FIG. 13 is a flowchart indicative of P1 processing.

The following describes P1 processing that is executed by the P1 processing block 123 and the correction control block 127 when DVB-T2 broadcasting is received by the receiving apparatus 100 shown in FIG. 8 with reference to the flowchart shown in FIG. 13. It should be noted that, as described above, it is assumed that the information contained in L1 pre-signaling and a coarse offset be preset on the receiving apparatus 100. For example, it is assumed that a coarse offset of a broadcast channel with pull-in of synchronism completed once in a DVB-T2 broadcast channel received in the past be preset.

It should be noted that, actually, a coarse offset value itself is not present, but a carrier frequency correction amount made up of fine offset and coarse offset is preset. However, as described above, because a fine offset typically causes minute variations due to the influence of the temperature characteristic and so on of the receiving apparatus, the re-detection of a fine offset need to be done even if the fine offset is preset.

In step S101, the P1 processing block 123 analyzes the P1 contained in a T2 frame received by the receiving apparatus.

In step S102, the P1 processing block 123 detects a fine offset and a coarse offset.

In step S103, whether the detection of a fine offset and a coarse offset is completed or not is determined. This determination is continued until the detection has been completed. As described above, because a coarse offset is detected by computing a correlation value every time the frequency is shifted by predetermined intervals for example, this detection takes a predetermined time until completed.

It should be noted that the detection of a fine offset is completed almost at the same time as the execution of the processing of step S102 and the carrier frequency correction amount is immediately supplied by the correction control block 127 to the carrier frequency correction block 122.

In step S103, if the detection of a fine offset and a coarse offset is determined to be completed, the procedure goes to step S104.

In step S104, the correction control block 127 determines whether the carrier frequency correction is necessary or not.

For example, if a coarse offset detected by the processing of step S102 is found different from the preset coarse offset, then the carrier frequency correction is determined to be necessary in step S104. On the other hand, if a coarse offset detected by the processing of step S102 is found to be the same as the preset coarse offset, then the carrier frequency correction is determined to be unnecessary in step S104.

If the carrier frequency correction is found to be necessary in step S104, then the procedure goes to step S105.

In step S105, the correction control block 127 supplies a resultant carrier frequency correction amount to the carrier frequency correction block 122, thereby reflecting the correction of the carrier frequency. Namely, in this case, for example, because the coarse offset detected by the processing of step S102 is different from the preset coarse offset, the carrier frequency correction processing is newly executed.

It should be noted that, in the above-mentioned case, as described above with reference to FIG. 7, the OFDM symbols of P1 and the first P2 may not be FFT-computed after executing the carrier frequency correction. Therefore, the demodulation of P1 and the first P2 will result in an improper demodulation.

If the processing of step S105 has been executed, the processing is reset in the receiving apparatus 100 and the demodulation of P1 is newly executed in the following T2 frame.

Alternatively, if the processing of step S105 is executed, the processing may be continued without reset in the receiving apparatus 100.

In the above-mentioned case, because the information contained in L1 pre-signaling is preset, P2 need not be demodulated to acquire L1 pre-signaling. It should also be noted here that the demodulation results of P1 and the first P2 may be recovered by the error correction processing to be executed after the processing of the equalization processing section 140. In this case, it is considered that the continuation of the reception of DVB-T2 digital broadcasting in the receiving apparatus 100 does not cause any special problems, so that the processing may be continued without reset.

On the other hand, if the carrier frequency correction is determined to be unnecessary in step S104, then the processing of step S105 is skipped, upon which the procedure goes to step S106.

To be more specific, in the above-mentioned case, for example, because the coarse offset detected by the processing of step S102 is the same as the preset coarse offset, the carrier frequency correction need not be newly executed, so that the reception of DVB-T2 digital broadcasting is continued in the receiving apparatus 100 without change.

In step S106, the P1 processing block 123 switches between the control signals that control the switch 129, the switch 130, and the time direction interpolation block 142.

To be more specific, before the processing of step S106 is executed the switch 129 is opened and, after the processing of step S106 is executed, the switch 129 is closed.

Before the processing of step S106 is executed the switch 130 is opened and, after the processing of step S106 is executed, the switch 130 is closed.

Further, before the processing of step S106 is executed the time direction interpolation block 142 operates not to execute interpolation and, after the processing of step S106 is executed, the time direction interpolation block 142 operates to execute interpolation.

As described above, the P1 processing is executed.

By doing so, the pull-in of synchronism of DVB-T2 can be executed at high speeds as described above with reference to FIG. 3 through FIG. 7.

To be more specific, if the pull-in of synchronism is executed without preset, the pull-in of synchronism desires two frames and the modulation of all OFDM symbols is enabled from the third frame, thereby enabling the decoding of an intended PLP.

On the other hand, presetting the information contained in L1 pre-signaling completes the pull-in of synchronism with one frame and allows the demodulation of all OFDM symbols from the second frame, thereby enabling the decoding of an intended PLP.

In addition, presetting a coarse offset in addition to the information contained in L1 pre-signaling allows the demodulation of all OFDM symbols from the first frame, thereby enabling the decoding of an intended PLP. However, the preset coarse offset is not necessarily be proper.

According to the embodiments of the present invention, all OFDM symbols can be demodulated starting from the first frame to decode an intended PLP in the receiving apparatus 100. If a preset coarse offset is not proper, the pull-in of synchronism is redone from the beginning, so that a risk of lowering the processing speed can be prevented.

It should be noted that the processing shown in FIG. 13 has been described by assuming that a coarse offset obtained on the basis of the pull-in of synchronism at the time of past reception be preset in the receiving apparatus 100; however, this coarse offset is not necessarily be preset. For example, at the beginning of the processing shown in FIG. 13, the processing may be executed assuming that the coarse offset be 0. In this case, if the coarse offset detected by the processing step S102 is not 0, carrier frequency correction processing is determined to be necessary in step S105.

It should be noted that the above-mentioned sequence of processing operations may be executed by software as well as hardware. When the above-mentioned sequence of processing operations is executed by software, the programs constituting the software are installed, from a network or recording media, into a computer which is built in dedicated hardware equipment or installed, from a network or recording media, into a general-purpose personal computer 700 for example in which various programs may be installed for the execution of various functions.

Referring to FIG. 14, a CPU (Central Processing Unit) 701 executes various kinds of processing operations as instructed by computer programs stored in a ROM (Read Only Memory) 702 or loaded from a storage block 708 into a RAM (Random Access Memory) 703. The RAM 703 also stores, as appropriate, data necessary for the CPU 701 to execute various kinds of processing operations.

The CPU 701, the ROM 702, and the RAM 703 are interconnected via a bus 704. This bus is also connected with an input/output interface 705.

The input/output interface 705 is connected with an input block 706 having a keyboard and a mouse, for example, and an output block 707 having a display monitor based on an LCD (Liquid Crystal Display) and a loudspeaker. Also, the input/output interface 705 is connected with a storage block 708 having a hard disk, for example, and a communication block 709 having a modem and a network interface card such as a LAN card. The communication block 709 is configured to execute communication processing via a network including the Internet.

In addition, the input/output interface 705 is connected with a drive 710 as necessary, on which a removable media 711 such as a magnetic disk, optical disk, a magneto-optical disk, or a semiconductor memory is loaded as appropriate. Computer programs read from the removable media 711 are stored in the storage block 708 as appropriate.

In order to execute the above-mentioned sequence of processing operations by means of software for example, programs constituting this software are installed from a network such as the Internet or recording media such as the removable media 711, for example.

It should be noted that, as shown in FIG. 14, these recording media are constituted by not only the removable media 711 made up of the magnetic disk (including flexible disks), the optical disk (including CD-ROM (Compact Disk Read Only Memory) and DVD (Digital Versatile Disk)), the magneto-optical disk (including MD (Mini Disk) (trademark)), or the semiconductor memory which is distributed separately from the apparatus itself, but also the ROM 702 or the hard disk in the storage block 708 which stores programs and is provided to users as incorporated in the apparatus itself in advance.

It should be noted herein that the above-mentioned sequence of processing operations include not only those which are sequentially executed in a time-dependent manner but also the processing operations which are executed concurrently or discretely.

While preferred embodiments of the present invention have been described using specific terms, such description is for illustrative purpose only, and it is to be understood that changes and variations may be made without departing from the spirit or scope of the following claims.

The present application contains subject matter related to that disclosed in Japanese Priority Patent Application JP 2009-173592 filed in the Japan Patent Office on Jul. 24, 2009, the entire content of which is hereby incorporated by reference.

What is claimed is:

1. A receiving apparatus comprising:
preamble analysis means for receiving a frame of Digital Video Broadcasting-Terrestrial 2 made up of an Orthogonal Frequency Division Multiplexing signal and analyzing a preamble contained in the received frame;
offset detection means for detecting a first fine carrier frequency offset and a coarse carrier frequency offset on the basis of the analyzed preamble;
carrier frequency correction means for executing carrier frequency correction on an Orthogonal Frequency Division Multiplexing time domain signal obtained by quadrature demodulation on the basis of the detected first fine carrier frequency offset and the detected coarse carrier frequency offset;
determination means for determining whether the detection of said coarse carrier frequency offset has been completed; and
control signal output means for, when the detection of said coarse carrier frequency offset is determined to be completed, outputting a control signal for feeding back a second fine carrier frequency offset detected on the basis of an Orthogonal Frequency Division Multiplexing frequency domain signal obtained by applying Fast Fourier Transform computation to an output of said carrier frequency correction means,
wherein, when the detection of said coarse carrier frequency offset is determined to be completed, said control signal output means further outputs a control signal for feeding back a sampling error detected on the basis of said Orthogonal Frequency Division Multiplexing frequency domain signal to a sampling means for sampling said Orthogonal Frequency Division Multiplexing time domain signal.

2. The receiving apparatus according to claim 1, wherein, when the detection of said coarse carrier frequency offset is determined to be completed, said control signal output means further outputs a control signal for starting processing associated with interpolation in time direction in equalization processing on said Orthogonal Frequency Division Multiplexing frequency domain signal.

3. The receiving apparatus according to claim 1, wherein, when a carrier frequency correction amount determined based on said first fine carrier frequency offset and said coarse carrier frequency offset obtained as a result of the detection by said offset detection means differs from a preset carrier frequency correction amount, said preamble is newly analyzed in a next frame based on Digital Video Broadcasting-Terrestrial 2.

4. The receiving apparatus according to claim 1, wherein said frame based on Digital Video Broadcasting-Terrestrial 2 contains a preamble different from said preamble and predetermined signaling information contained in this different preamble is preset.

5. The receiving apparatus according to claim 4, wherein a carrier frequency correction amount determined based on said first fine carrier frequency offset and said coarse carrier frequency offset obtained as a result of past reception is further preset.

6. A receiving method comprising the steps of:
receiving, by a hardware preamble analyzer, a frame of Digital Video Broadcasting-Terrestrial 2 made up of an Orthogonal Frequency Division Multiplexing signal and analyzing a preamble contained in the received frame;
detecting, by an offset detector, a first fine carrier frequency offset and a coarse carrier frequency offset on the basis of the analyzed preamble;
executing, by a carrier frequency corrector, carrier frequency correction on an Orthogonal Frequency Division Multiplexing time domain signal;
determining, by a determiner, whether the detection of said coarse carrier frequency offset has been completed;
when the detection of said coarse carrier frequency offset is determined to be completed, outputting, by a control signal outputter, a control signal for feeding back a second fine carrier frequency offset detected on the basis of an Orthogonal Frequency Division Multiplexing frequency domain signal obtained by applying Fast Fourier Transform computation to an output of said carrier frequency corrector; and
outputting, by said control signal outputter, when the detection of said coarse carrier frequency offset is determined to be completed, a control signal for feeding back a sampling error detected on the basis of said Orthogonal Frequency Division Multiplexing frequency domain signal to a sampler that samples said Orthogonal Frequency Division Multiplexing time domain signal.

7. A non-transitory computer-readable storage medium having computer readable program codes embodied in the computer readable storage medium that, when executed cause a computer to execute:
receiving a frame of Digital Video Broadcasting-Terrestrial 2 made up of an Orthogonal Frequency Division Multiplexing signal and analyzing a preamble contained in the received frame;
detecting a first fine carrier frequency offset and a coarse carrier frequency offset on the basis of the analyzed preamble;
executing carrier frequency correction on an Orthogonal Frequency Division Multiplexing time domain signal obtained by quadrature demodulation on the basis of the detected first fine carrier frequency offset and the detected coarse carrier frequency offset;

determining whether the detection of said coarse carrier frequency offset has been completed;

when the detection of said coarse carrier frequency offset is determined to be completed, outputting a control signal for feeding back a second fine carrier frequency offset detected on the basis of an Orthogonal Frequency Division Multiplexing frequency domain signal obtained by applying Fast Fourier Transform computation to an output of said carrier frequency correction; and outputting, when the detection of said coarse carrier frequency offset is determined to be completed, a control signal for feeding back a sampling error detected on the basis of said Orthogonal Frequency Division Multiplexing frequency domain signal to a sampler that samples said Orthogonal Frequency Division Multiplexing time domain signal.

8. A receiving apparatus comprising:

a hardware preamble analyzer configured to receive a frame of Digital Video Broadcasting-Terrestrial 2 made up of an Orthogonal Frequency Division Multiplexing signal and analyze a preamble contained in the received frame;

an offset detector configured to detect a first fine carrier frequency offset and a coarse carrier frequency offset on the basis of the analyzed preamble;

a carrier frequency corrector configured to execute carrier frequency correction on an Orthogonal Frequency Division Multiplexing time domain signal obtained by quadrature demodulation on the basis of the detected first fine carrier frequency offset and the detected coarse carrier frequency offset;

a determiner configured to determine whether the detection of said coarse carrier frequency offset has been completed; and a control signal outputter configured, when the detection of said coarse carrier frequency offset is determined to be completed, to output a control signal for feeding back a second fine carrier frequency offset detected on the basis of an Orthogonal Frequency Division Multiplexing frequency domain signal obtained by applying Fast Fourier Transform computation to an output of said carrier frequency corrector, wherein, when the detection of said coarse carrier frequency offset is determined to be completed, said control signal outputter further outputs a control signal for feeding back a sampling error detected on the basis of said Orthogonal Frequency Division Multiplexing frequency domain signal to a sampler that samples said Orthogonal Frequency Division Multiplexing time domain signal.

* * * * *